UNITED STATES PATENT OFFICE.

JOHANNES STOCKER AND HERMANN ZANDER, OF BERLIN, GERMANY.

INSULATING SUBSTANCE AND PROCESS OF MANUFACTURING SAME.

SPECIFICATION forming part of Letters Patent No. 695,587, dated March 18, 1902.

Application filed April 19, 1901. Serial No. 56,607. (No specimens.)

*To all whom it may concern:*

Be it known that we, JOHANNES STOCKER and HERMANN ZANDER, subjects of the King of Prussia, German Emperor, and residents of Berlin, in the Kingdom of Prussia, German Empire, have invented a certain new and useful Improved Insulating Substance and Process of Manufacturing the Same, of which the following is a full, clear, and exact description.

This invention relates to an improved substance and the process for making the same, which substance is an excellent insulating material against electricity and heat; also serves for steam-joints, and is also fire, water, and acid resisting. It possesses the property of being capable of being worked, bored, cut, nailed, polished, and the like, worked on a lathe, and of having threads cut thereon and the like. Plates, tubes, bars, and other molded articles of suitable length, width, and thickness may also be made therefrom. The substance may be suitably colored, patterned, provided with suitable recesses and elevations and the like, so that imitations of marble, granite, slate, and the like may be made therefrom which may be employed more particularly for covering walls; also imitation slates for roofing purposes, which latter have the advantages over natural slates of being unbreakable, cheaper, lighter weight, and capable of having tongues and grooves formed on the plates, and thus being fitted closely to one another to a completely-even surface, while the joints can be filled up with the same substance in a liquid condition, so that when the same is set a uniform or unbroken plate, roof, or wall is obtained.

The manufacture of this substance takes place as follows: Three parts of caustic potash are dissolved in twenty parts of water, and a one-fourth part of borax is dissolved in the mixture, and then as much finely-ground lardite (lardstone) is added thereto until a thick liquid paste is formed, which is kept for about twenty-four hours in a hermetically-closed vessel. The addition of borax has for its object to effect the complete solution of the lardite when dissolved with caustic potash, which could not be fully obtained without borax. By allowing the mixture to stand for twenty-four hours with air excluded the borax allies itself completely with the greasy constituents of the lardite, and by this means a fully homogeneous lardite paste is obtained, which is an indispensable condition for obtaining a perfectly-impervious final product. After the superfluous liquid has been removed from the lardite paste thus obtained two parts of calcined alum (preferably the commercially-sold and so-called "feather-alum" or striated alum, a fibrous or wadding-like alum, which can be completely dissolved) is added thereto, and also, according to the desired hardness of the finished product, one to three parts of calcined magnesia, which is finally stirred with a small quantity of chlorid of calcium and three parts of some greasy material. The object of the addition of chlorid of calcium is to reduce to a small amount any moisture still existing in the mixture and to protect the final product against the reabsorption of moisture and to render it permanently non-absorbent. The chlorid of calcium may be dissolved in milk before being added to the mass in order to bring into action in the ordinary manner the casein contained in the said milk; but this is not absolutely necessary. Any suitable grease substance may be added, the object of this addition being to render the substance unattackable by acids and other like destructive substances. Oil would at first suggest itself as being the easiest to evenly mix with the substance; but oil easily again runs out of the mixture when the latter is hot-pressed, and therefore a somewhat large quantity of oil has to be employed. The manufacture has been found more economical when a grease of higher melting-point is employed—such, for instance, as Brazilian wax, which has a very high melting-point and is therefore preferable, as a considerable saving of grease is effected by its use. Brazilian wax is rubbed down before its addition to the mass in order to allow of its being evenly incorporated therewith.

By suitably coloring the above-described compound the final product may be made in any desired shade of color.

Where the compound is to be mixed with color it is first ground in a color-mill, the mass run into molds, subjected therein to a somewhat considerable heating, dried for two to three hours in a drying-stove until it contains very little moisture, and then finally compressed under an hydraulic press heated by steam, the said steam having a temperature of 100° to 150°. Before this treatment the still fluid mass may, if desired, have layers of paper, canvas, or the like inserted, which serves as a filling material and reduces the cost of the product owing to the cheapness of the paper. The paper or the like is soaked with the mass, then the layers laid over each other, and then hotly pressed. This is a special modification of the manufacture.

If articles are to be made of the substance itself without such insertions—for instance, for insulation purposes—the as yet unshaped or unmolded but still thoroughly dry mass is preferably reduced to a fine powder and suitable molds are filled therewith in which the pulverulent mass is converted into a solid perfectly homogeneous form by heat and pressure. In this manner the most thorough mutual adhesion of all the particles is brought about in such a way that all porosity in the final product is avoided and it is capable of being used for insulation.

Having now described our invention, what we claim as new, and desire to secure by Letters Patent, is—

1. The herein-described process consisting in forming a mixture of a caustic-potash solution, ground lardite and borax which latter is used in order to fully dissolve the lardite, allowing the mixture to stand for a time under exclusion of air, then adding alum and magnesia, allowing the mixture to dry, then adding chlorid of calcium and grease and mixing the same and finally heating and pressing the mixture, substantially as described.

2. The herein-described compound consisting of caustic potash, lardite, borax, alum and magnesia, chlorid of calcium and grease, substantially as described.

In witness whereof we have hereunto set our hands in presence of two witnesses.

JOHANNES STOCKER.
HERMANN ZANDER.

Witnesses:
HENRY HASPER,
WOLDEMAR HAUPT.